L. C. WOERNER.
EXPANSION REAMER.
APPLICATION FILED APR. 14, 1909.

937,404.

Patented Oct. 19, 1909.

Attest:
Ewd L. Tolson
Bent M. Stahl

Inventor:
Louis Christian Woerner,
By Isaac Middleton Donaldson & Co.
Attys.

UNITED STATES PATENT OFFICE.

LOUIS CHRISTIAN WOERNER, OF WESTEND, NEAR BERLIN, GERMANY, ASSIGNOR TO LUDW. LOEWE & COMPANY, OF BERLIN, GERMANY.

EXPANSION-REAMER.

937,404. Specification of Letters Patent. Patented Oct. 19, 1909.

Application filed April 14, 1909. Serial No. 489,812.

*To all whom it may concern:*

Be it known that I, LOUIS CHRISTIAN WOERNER, citizen of the United States, residing at Westend, near Berlin, Germany, have invented certain new and useful Improvements in Expansion-Reamers, of which the following is a specification.

This invention relates to expansion reamers, that is, reamers which are slotted and bored longitudinally and are expanded by a device inserted in the bore.

The expansion is usually effected by screwing in a conical plug at one end or the other, but this arrangement is unsatisfactory as the central portion of the reamer cannot be appreciably expanded.

The object of the present invention is to avoid this difficulty and also to reduce the cost of manufacture by dispensing with the necessity for parts which have to be accurately fitted.

The invention consists in providing the longitudinally slotted reamer with a plain tapered bore, and in expanding the reamer by inserting one or more steel balls or the like within the bore, the ball or balls being automatically retained in position by the elasticity of the sides of the reamer.

In the accompanying drawings, one mode of carrying out the invention is illustrated by way of example.

Figure 1:
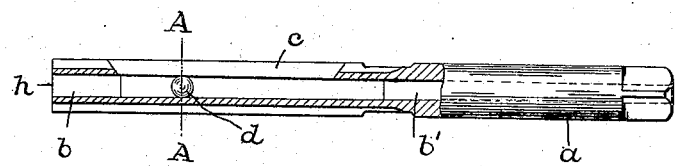
Figure 2:
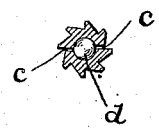
Figure 3:
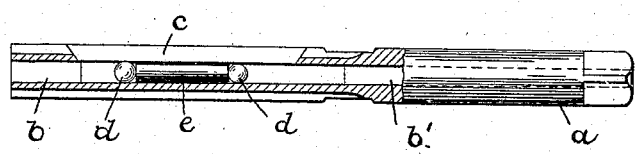

Figure 1 is a side elevation of the expansion reamer partly in section. Fig. 2 is a cross section on the line A—A of Fig. 1. Fig. 3 is a similar view to Fig. 1 but illustrates the use of two balls.

In carrying out the invention according to one mode the reamer $a$, is provided with a tapered bore $b$, $b'$, the greatest diameter of which is at the front end of the reamer. The central portion of the reamer is provided with radially arranged longitudinal slots $c$.

The reamer is expanded by means of a steel ball $d$, the diameter of which corresponds to the greater diameter $h$, of the bore $b$, $b'$. The ball is introduced at the front end of the reamer and is pushed forward toward the central portion. By this means the slotted portion of the reamer is expanded so that the external diameter of the same is increased. If only one ball is used as illustrated in Fig. 1, then the reamer has the largest diameter at the part where the ball is situated as the hollow ends of the reamer do not participate in the distension or expansion. If the reamer is not to be expanded at one place only but throughout a greater portion of its length, then several balls, preferably separated by means of distance pieces $e$, are introduced into the bore as illustrated in Fig. 3. When uniform expansion throughout a considerable portion of the reamer is required, balls of the correct relative diameter should be used. It is to be understood that the bore of the reamer tapers so slightly that when a ball is inserted it is automatically fixed or jammed in any position into which it may be pushed. If desired the bore may taper in the opposite direction to that illustrated.

What is claimed is:—

1. In combination with a longitudinally slotted expansion reamer having a tapered bore, a ball arranged to be moved in the bore so as to expand the reamer.

2. An expansion reamer comprising a body portion longitudinally slotted and having a tapered bore, a pair of balls adapted to be moved in the bore to expand the reamer and a distance piece between the balls.

In testimony whereof, I affix my signature in presence of two witnesses.

LOUIS CHRISTIAN WOERNER.

Witnesses:
 HENRY HASPER,
 WOLDEMAR HAUPT.